United States Patent
Wang

(10) Patent No.: US 9,304,349 B2
(45) Date of Patent: Apr. 5, 2016

(54) TOUCH DISPLAY PANEL AND DISPLAY DEVICE

(71) Applicant: BEIJING BOE OPTOELECTRONICS TECHNOLOGY CO., LTD., Beijing (CN)

(72) Inventor: Shijun Wang, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 13/967,487

(22) Filed: Aug. 15, 2013

(65) Prior Publication Data

US 2014/0063363 A1    Mar. 6, 2014

(30) Foreign Application Priority Data

Aug. 31, 2012 (CN) .......................... 2012 1 0320727

(51) Int. Cl.
*G02F 1/1335* (2006.01)
*G02F 1/1333* (2006.01)
*G06F 3/041* (2006.01)
*G06F 3/044* (2006.01)

(52) U.S. Cl.
CPC ............ *G02F 1/13338* (2013.01); *G06F 3/044* (2013.01); *G06F 3/0412* (2013.01)

(58) Field of Classification Search
CPC .... G02F 1/13338; G06F 3/0412; G06F 3/044
USPC ........................................................ 349/12
See application file for complete search history.

(56) References Cited

U.S. PATENT DOCUMENTS

| | | | |
|---|---|---|---|
| 8,289,457 B2* | 10/2012 | Hwang et al. | 349/12 |
| 2010/0060602 A1* | 3/2010 | Agari et al. | 345/173 |
| 2010/0149116 A1* | 6/2010 | Yang | G06F 3/0416 345/173 |
| 2011/0242444 A1* | 10/2011 | Song | 349/43 |
| 2012/0105337 A1 | 5/2012 | Jun et al. | |
| 2013/0162549 A1* | 6/2013 | Kim et al. | 345/173 |

FOREIGN PATENT DOCUMENTS

| | | |
|---|---|---|
| CN | 1598662 A | 3/2005 |
| CN | 101424811 A | 5/2009 |
| JP | 2012-098687 A | 5/2012 |

OTHER PUBLICATIONS

First Chinese Office Action dated Jul. 2, 2014: Appln. No. 201210320727.9.

(Continued)

*Primary Examiner* — Charles Chang
(74) *Attorney, Agent, or Firm* — Ladas & Parry LLP

(57) ABSTRACT

The disclosure of the present invention discloses a touch display panel. The touch display panel comprises a color filter substrate, an array substrate, a liquid crystal layer and a touch sensing film positioned at a side of the color filter substrate which is away from the liquid crystal layer, wherein the color filter substrate comprises a substrate and a black matrix provided with a plurality of opening areas which are in array distribution; the touch sensing film comprises a substrate, one side of the substrate is provided with a plurality of first electrodes, the other side surface of the substrate is provided with a plurality of second electrodes, the projections of the first electrodes and the second electrodes on the color filter substrate are intersected with each other, the first electrodes are color filter electrodes, and the projections on the color filter substrate are opposite to the opening areas.

10 Claims, 1 Drawing Sheet

(56) References Cited

OTHER PUBLICATIONS

Korean Office Action dated Aug. 12, 2014; Appln. No. 10-2013-0087291.

Second Chinese Office Action dated Jan. 26, 2015; Appln. No. 201210320727.9.

Korean Notice of Allowance dated Feb. 11, 2015; Appln. No. 10-2013-0087291.

* cited by examiner

TOUCH DISPLAY PANEL AND DISPLAY DEVICE

TECHNICAL FIELD

The embodiments of the present invention relate to a touch display panel and a display device.

BACKGROUND

As rising of people's living standards, the requirements for electronics products, such as mobile phones and tablets, etc., are higher and higher, and the touch display has also become an essential requirement of the advanced electronic products. In view of the customers' demands, the competition in the market of the mobiles and the tablets becomes more and more intense.

The capacitive touch display panel is operated by changing the capacitance between two layers of induction electrodes of the touch sensing film so as to produce a current for driving the touch display panel.

As shown in FIG. 1, FIG. 1 is a schematic view of a part of the structure of the touch display panel in the prior art.

The traditional touch display panel comprises a touch sensing film and a display panel. The color filter substrate portion of the display panel comprises a substrate 7, color resin 8 and a black matrix 9 of the color filter substrate. The touch sensing film comprises a substrate 4, a plurality of longitudinally extending first electrodes 1 and a plurality of laterally extending second electrodes 5 generated on two sides of the substrate 4 respectively; a first electrode protective layer 2 provided on the outside of the first electrode 1, and a surface protective layer 3 provided on the outside of the first electrode protective layer 2; a second electrode protective layer 6 provided on the outside of the second electrode 5, and a substrate 7 provided on a side of the second electrode protective layer 6 which is away from the substrate 4. The substrate 7 is provided with a black matrix 9 and color resin 8. A plurality of lateral portions and a plurality of longitudinal portions of the black matrix 9 are intersected with each other so as to form a mesh structure, and two lateral portions and longitudinal portions adjacent to each other form an opening area, the color resin 8 covers that opening area, and various colors of the color resin 8 are provided alternatively in turn.

The color resin 8 is used for displaying colors by the touch display panel.

The color resin 8 of the touch display panel in prior art is provided on the color filter substrate, and there are provided the longitudinally distributed first electrodes 1 and the laterally distributed second electrodes 5 in the touch sensing film, which has a plurality of layer levels with complex structure.

SUMMARY

The embodiments of the present invention provide a touch display panel and a display device so as to simplify the touch display panel and the display device in prior art.

In order to achieve above objects, the embodiments of the present invention provide the following technical solutions.

One aspect of the present invention provides a touch display panel, which comprises a color filter substrate, an array substrate provided opposite to the color filter substrate, a liquid crystal layer positioned between the color filter substrate and the array substrate, and a touch sensing film positioned on a side of the color filter substrate which is away from the liquid crystal layer; the color filter substrate comprising a first substrate, and a black matrix provided on the first substrate, the black matrix provided with a plurality of opening areas which are in array distribution; the touch sensing film comprising a second substrate, one side of the second substrate provided with a plurality of first electrodes in parallel with each other and each having a strip-like structure, the other side provided with a plurality of second electrodes in parallel with each other and each having a strip-like structure, the projections of the first electrodes and the second electrodes on the color filter substrate being intersected with each other, the first electrodes being color filter electrodes with color filtering function, and the projections of the first electrodes on the color filter substrate opposite to the opening areas which are in array distribution.

Preferably, for example, the projections of the first electrodes are perpendicular to the projections of the second electrodes.

Preferably, for example, the first electrodes are drive electrodes, and the second electrodes are induction electrodes.

Preferably, for example, the first electrodes are induction electrodes, and the second electrodes are drive electrodes.

Preferably, for example, the first electrodes comprise at least a red color filter electrode, a green color filter electrode, and a blue color filter electrode, and the color filter electrodes with various colors are provided alternatively in turn.

Preferably, for example, a first electrode protective layer is provided on the outside of the first electrodes, and a second electrode protective layer is provided on the outside of the second electrode.

Preferably, for example, a surface protective layer of the touch display panel is provided on a side of the touch sensing film which is away from the color filter substrate.

Preferably, for example, the first electrodes are closer to the color filter substrate in comparison with the second electrodes.

Preferably, for example, the second electrodes are closer to the color filter substrate in comparison with the first electrodes.

Another aspect of the present invention provide a display device, which comprises the touch display panel mentioned in any one of the aforesaid technical solutions.

Yet another aspect of the present invention further provides a touch display panel, which comprises a color filter substrate, an array substrate provided opposite to the color filter substrate, a liquid crystal layer positioned between the color filter substrate and the array substrate, and a touch sensing film positioned on a side of the color filter substrate which is away from the liquid crystal layer; the color filter substrate comprising a first substrate, and a black matrix provided on the first substrate, the black matrix provided with a plurality of opening areas which are in array distribution, the touch sensing film comprising a second substrate, one side of the second substrate provided with a plurality of first electrodes in parallel with each other and each having a strip-like structure, the other side provided with a plurality of second electrodes in parallel with each other and each having a strip-like structure, the projections of the first electrodes and the second electrodes on the color filter substrate being intersected with each other, the first electrodes being color filter electrodes with color filtering function, and the projections of the first electrodes on the color filter substrate opposite to the opening areas which are in the array distribution.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, and thus are not limitative of the invention.

DETAILED DESCRIPTION

The technical solutions of the embodiments of the invention will be described in a clearly and fully understandable way in connection with the drawings related to the embodiments of the invention. It is obvious that the described embodiments are just a part but not all of the embodiments of the invention. According to the embodiments of the invention, all other embodiments obtained by those ordinary skilled in the art under the premise of without creative efforts are all intend to be within the scope of the invention.

Unless otherwise defined, the technical or scientific terms used herein shall have the general meanings understandable for those ordinarily skilled in the field of the present invention. "First", "second" and the like used in specification and claims of the patent application of the present invention do not show any order, number or importance, but are only used to distinguish different constituent parts. Likewise, the words such as "a", "an", "the" or similar shall not represent limitation of numbers, but mean existence of at least one. The phrases such as "include", "comprise" or similar intend to mean the elements or objects before such words cover or are equivalent to the elements or objects listed after such words, but other elements or objects are not exclusive. The phrases such as "connect", "connected" or similar are not limited to physical or chemical connection, but also include electrical connection, no matter directly or indirectly. The phrases such as "upper", "lower", "left", "right" and etc. shall be used only to represent relative positions, wherein when the absolute position of the described object is changed, the relative positions may be changed accordingly.

Figure 1:
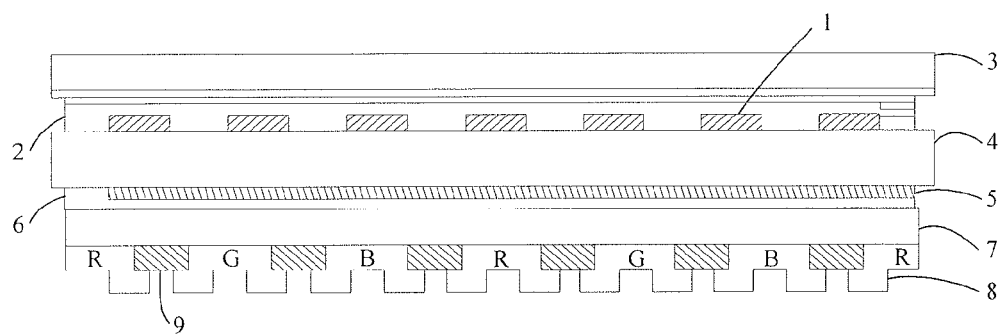
FIG. 1 is a schematic view of a part of the structure of the touch display panel in the prior art.
Figure 2:
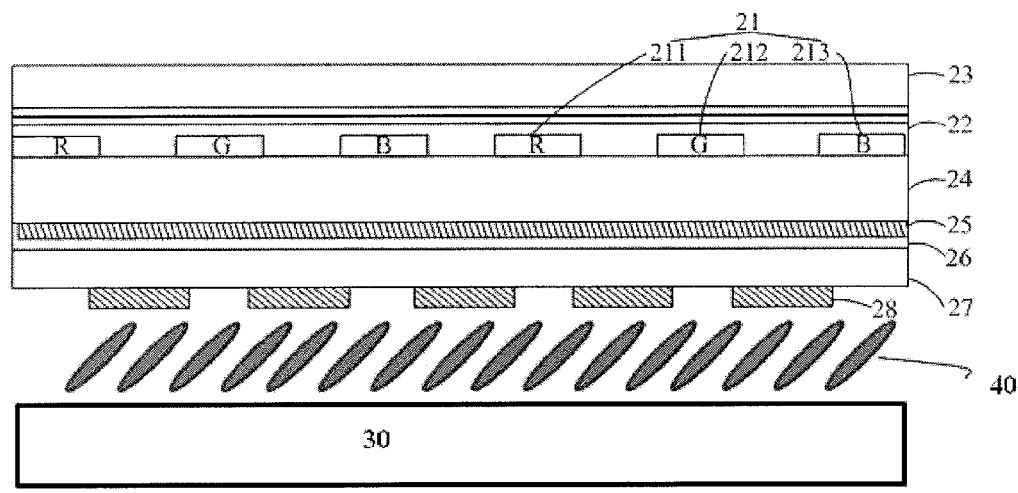
FIG. 2 is a schematic view of a principle structure of the touch display panel provided in an embodiment of the present invention.
Figure 3:
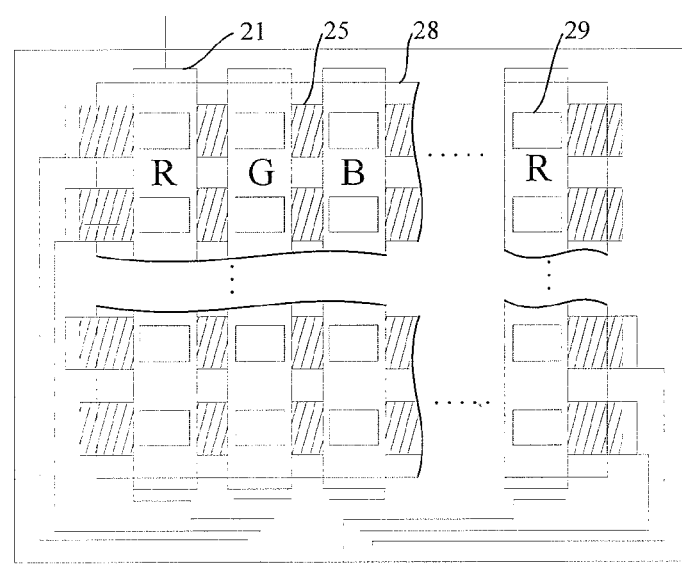
FIG. 3 is a top view of the structure of the touch display panel provided in the embodiment of the present invention.

As shown in FIG. 2 and FIG. 3, FIG. 2 is a schematic view of the principle structure of the touch display panel provided in an embodiment of the present invention, and FIG. 3 is a top view of the structure of the touch display panel provided in the embodiment of the present invention.

The touch display panel according to the embodiment of the present invention comprises a color filter substrate, an array substrate 30 provided opposite to the color filter substrate, a liquid crystal layer 40 positioned between the color filter substrate and the array substrate, and a touch sensing film positioned on one side of the color filter substrate which is away from the liquid crystal layer.

The color filter substrate comprises a first substrate 27 and a black matrix 28 which is provided on the first substrate 27, and the black matrix 28 is provided with a plurality of opening areas 29 which are in array distribution.

The touch sensing film comprises a second substrate 24, one side of the second substrate 24 is provided with a plurality of first electrodes 21 in parallel with each other and each having strip-like structure, and the other side is provided with a plurality of second electrodes 25 in parallel with each other and each having strip-like structure. The projections of the first electrodes 21 and the second electrodes 25 on the color filter substrate are intersected with each other. The first electrodes 21 are color filter electrodes with color filtering function, and the projections of the first electrodes 21 on the color filter substrate are opposite to the opening areas 29 which are in the array distribution.

In the touch display panel according to the embodiments of the present invention, the lights passing through the aforesaid opening areas 29 need to penetrate the first electrodes 21, and thus the first electrodes 21 can realize the color filtering effect of the color resin in the color filter substrate, thus there is no necessary to provide the color resin in the color filter substrate. Therefore, the first electrodes in the touch sensing film in the prior art is combined with the color resin in the color filter substrate, and thus the structure of the color filter substrate is simplified, and furthermore the structure of the touch display panel is simplified.

Additionally, the touch display panel according to the embodiments of the present invention combines the first electrodes in the touch sensing film and the color resin in the color filter substrate in the prior art into one part, and therefore during the preparation of the color filter substrate and the touch sensing film, the masks for producing the first electrodes in the touch sensing film can be reduced in comparison with those in the prior art. To prepare the first electrodes in the touch sensing film by using the masks for preparing the color resin in the color filter substrate in the prior art not only simplifies the whole preparation process, but also reduce the process cost due to saving a mask, which raises the competitiveness of the product in the market.

The color filter electrode mentioned in above technical solution may be obtained by blending the conductive polymer with the color pigments.

Preferably, for example, the aforesaid first electrodes 21 and the second electrodes 25 can be perpendicular to each other.

Specifically, for example, the aforesaid first electrodes 21 are drive electrodes, and the second electrodes 25 are induction electrodes.

Likewise, the aforesaid first electrodes 21 may be induction electrodes, and the second electrodes 25 may be drive electrodes.

In a preferable embodiment, for example, the aforesaid first electrodes comprise at least a red color filter electrode 211, a green color filter electrode 212, and a blue color filter electrode 213, and the color filter electrodes with various colors are provided alternatively in turn. The aforesaid first electrodes may also comprise an orange color filter electrode, a yellow color filter electrode, and/or other color filter electrodes, which are not listed one by one herein.

Preferably, for example, a first electrode protective layer 22 is provided on the outside of the first electrode 21, and a second electrode protective layer 26 is provided on the outside of the second electrode 25.

More preferably, for example, a surface protective layer 23 of the touch display panel is provided on the side of the touch sensing film which is away from the color filter substrate.

Preferably, for example, in order to prevent the occurrence of light leakage, the first electrodes 21 are closer to the color filter substrate in comparison with the second electrode 25.

Alternatively, it can be the second electrode 25 which is more closer to the color filter substrate (as shown in FIG. 2), and the width of the first electrodes 21 is larger than the width of the opening areas 29 of the black matrix 28, which may also prevent the occurrence of light leakage.

The embodiments of the present invention further provide a display device, which comprises the touch display panel mentioned in any one of above technical solutions.

In the touch display panel according to the embodiments of the present invention, a black matrix is formed on the first substrate of the color filter substrate, and the black matrix is provided with a plurality of opening areas which are in array distribution, the first electrodes in the touch sensing film are alternatively arranged color filter electrodes with the color filtering function and opposite to the opening areas which are in array distribution in the black matrix. Lights passing through above opening areas 29 need to penetrate the first electrodes 21, and therefore, the first electrodes 21 can realize the color filtering effect of the color resin in the color filter substrate in the prior art, thus there is no need to provide the color resin in the color filter substrate. Accordingly, the first electrodes in the touch sensing film are combined with the color resin in the color filter substrate so that the structure of the touch display panel is simplified.

It is apparent that various modifications and variations may be made by those skilled in the art without departing from the spirit and scope of the present invention. In this way, if these modifications and variations of the present invention fall in the scope of the claims and its equivalent technologies of this invention, it is intended that the present invention will include these modifications and variations.

What is claimed is:

1. A touch display panel, comprising:
    a color filter substrate; an array substrate opposite to the color filter substrate; a liquid crystal layer positioned between the color filter substrate and the array substrate; and a touch sensing film positioned at a side of the color filter substrate which is away from the liquid crystal layer;
    wherein the color filter substrate comprises a first substrate and a black matrix provided on the first substrate, and the black matrix is provided with a plurality of opening areas which are in array distribution;
    the touch sensing film comprises a second substrate, one side of the second substrate is provided with a plurality of first electrodes in parallel with each other and each having a strip-like structure, the other side of the second substrate is provided with a plurality of second electrodes in parallel with each other and each having a strip-like structure, the projections of the first electrodes and the second electrodes on the color filter substrate are intersected with each other, the first electrodes are color filter electrodes with color filtering function, and the projections of the first electrodes on the color filter substrate are opposite to the opening areas which are in array distribution.

2. The touch display panel according to claim 1, wherein the projections of the first electrodes on the color filter substrate are perpendicular to the projections of the second electrodes on the color filter substrate.

3. The touch display panel according to claim 1, wherein the first electrodes are drive electrodes and the second electrodes are induction electrodes.

4. The touch display panel according to claim 1, wherein the first electrodes are induction electrodes and the second electrodes are drive electrodes.

5. The touch display panel according to claim 1, wherein the first electrodes comprise at least a red color filter electrode, a green color filter electrode, and a blue color filter electrode, and the color filter electrodes with various colors are provided alternatively in turn.

6. The touch display panel according to claim 1, wherein a first electrode protective layer is provided on the outside of the first electrode, and a second electrode protective layer is provided on the outside of the second electrode.

7. The touch display panel according to claim 6, wherein a surface protective layer of the touch display panel is provided on a side of the touch sensing film which is away from the color filter substrate.

8. The touch display panel according to claim 7, wherein the first electrodes are closer to the color filter substrate in comparison with the second electrodes.

9. The touch display panel according to claim 7, wherein the second electrodes are closer to the color filter substrate in comparison with the first electrodes.

10. A display device comprising the touch display panel according to claim 1.

* * * * *